United States Patent [19]

Stach

[11] Patent Number: 5,718,485
[45] Date of Patent: *Feb. 17, 1998

[54] FRICTION WELDED BIMETALLIC VEHICLE WHEEL HAVING HOLLOW SPOKES

[75] Inventor: Jens Stach, Eberdingen, Germany

[73] Assignee: Dr. Ing. h.c.F. Porsche AG, Weissach, Germany

[*] Notice: The term of this patent shall not extend beyond the expiration date of Pat. No. 5,538,379.

[21] Appl. No.: 519,808

[22] Filed: Aug. 25, 1995

[30] Foreign Application Priority Data

Aug. 27, 1994 [DE] Germany ............................ 44 30 490.0
Oct. 6, 1994 [DE] Germany ............................ 44 35 666.8

[51] Int. Cl.$^6$ ........................................... B60B 23/00
[52] U.S. Cl. .................. 301/63.1; 301/95; 228/114.5; 29/894.322
[58] Field of Search ............................. 301/63.1, 64.1, 301/64.2, 64.3, 65, 95, 96, 97, 98; 29/894.321, 894.322, 894.323; 228/114.5, 125, 262.5

[56] References Cited

U.S. PATENT DOCUMENTS

| | | | |
|---|---|---|---|
| 1,393,928 | 10/1921 | Walther et al. | 301/65 |
| 1,433,764 | 10/1922 | Waterbor et al. | 301/65 |
| 1,566,344 | 12/1925 | Perrot et al. | 301/65 |
| 1,610,023 | 12/1926 | Meldrum | 301/65 |
| 1,626,211 | 4/1927 | Reed | 301/65 |
| 3,253,862 | 5/1966 | Watanabe | 301/65 |
| 4,341,425 | 7/1982 | Streicher et al. | 301/63.1 X |
| 5,526,977 | 6/1996 | Wei | 29/894.322 X |
| 5,538,329 | 7/1996 | Stach | 301/65 |
| 5,575,539 | 11/1996 | Stach | 301/65 |

FOREIGN PATENT DOCUMENTS

| | | |
|---|---|---|
| 0281903A2 | 9/1988 | European Pat. Off. |
| 0 486 755 A2 | 5/1992 | European Pat. Off. |
| 0 513 646 A1 | 11/1992 | European Pat. Off. |
| 2311740 | 9/1974 | Germany ............ 301/65 |
| 31 10756 A1 | 2/1982 | Germany |
| 4014368A1 | 3/1991 | Germany |
| 41 38 558 A1 | 5/1993 | Germany |
| 9400171.5 | 4/1994 | Germany |
| 4334601 | 11/1992 | Japan ............ 301/63.1 |
| WO 95/07826 | 3/1995 | WIPO |

OTHER PUBLICATIONS

Welding Journal; pp. 264s–270s; Nov. 1988; "Friction Welding of Incompatible Materials".
ASM Metals Handbook; Ninth Edition; pp. 719–728; 1983.

*Primary Examiner*—Russell D. Stormer
*Attorney, Agent, or Firm*—Evenson, McKeown, Edwards & Lenahan, P.L.L.C.

[57] ABSTRACT

A wheel for a motor vehicle comprises a wheel spider with hollow spokes formed from a first material and a rim formed from a second material. The wheel spider is connected to the rim by way of friction welding. The wheel spider may be formed by casting and the rim may be formed by casting or forging and may be further formed by rolling. The wheel spider and the rim may be selected from the group consisting of aluminum, aluminum alloy, magnesium, magnesium alloy, titanium or titanium alloy. A process for making the vehicle wheel by forming the wheel spider from a first material and the rim from a second material and connecting the wheel spider with the rim by friction welding.

12 Claims, 1 Drawing Sheet

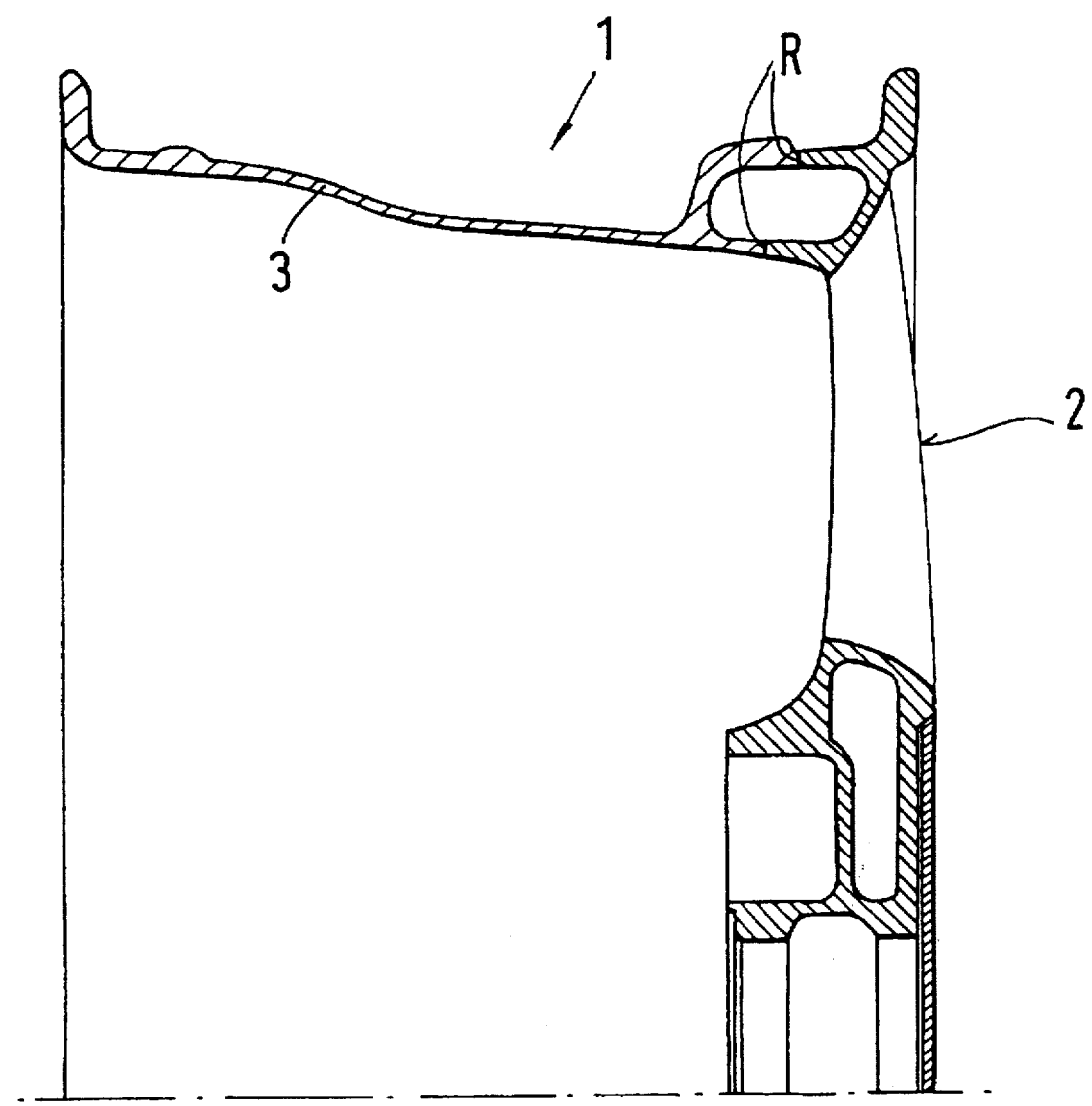

FRICTION WELDED BIMETALLIC VEHICLE WHEEL HAVING HOLLOW SPOKES

BACKGROUND AND SUMMARY OF THE INVENTION

This invention relates to a wheel for a motor vehicle, and more particularly, to a vehicle wheel having a wheel spider with hollow spokes which are welded to a rim. The invention also relates to processes for making the wheels.

From German Patent Document DE 41 38 558 C2 a wheel and a process for manufacturing the wheel are known. That wheel consists of a wheel spider which comprises hollow spokes and which is connected with a rim by means of a friction weld. Furthermore, from German Patent Document DE 31 10 756, a process has become known for manufacturing an aluminum rim, in which case the rim is produced by means of a pressing method.

An object of the present invention is to provide a wheel for a motor vehicle, and a process for making the same, which comprises two wheel elements, such as a wheel spider and a rim, which are connected in a welded manner and which are formed of various pairings of materials.

This and other objects have been achieved according to the present invention by providing a vehicle wheel, and a process for making the same, having a wheel spider with a plurality of hollow spokes which is connected with a rim by way of friction welding, where the wheel spider is formed from a first material and the rim is formed from a second material.

A particular advantage of the present invention is that since the wheel spider and the rim may be produced individually and then connected by means of a friction weld, a pairing of materials of these two wheel elements can be selected which allows for simple construction and corresponds to a special application purpose. For example, due to the specific weight of magnesium, a wheel or wheel part made of such a material is lighter in weight than a wheel constructed of an aluminum alloy. The use of titanium for the wheel parts results in advantages with respect to their stability and optimizes a friction welding connection of the wheel parts.

During the manufacturing process, a rim formed by a rolling or pressing method is subjected to a certain densening of the structure to prevent air permeability, which may not be ensured in the case of a rim which is cast and not rolled or pressed. In order to prevent air permeability in a rim which is only cast, it is usually sealed off on the inside with a lacquer or lacquer layers so that the interior of the tire is kept airtight. In particular, in the case of a rim made of magnesium, an air permeability may occur so that it is advantageous to then finish it by means of a rolling method, whereby additional operations, such as the application of lacquer layers, are avoided.

Furthermore, it has been found in practice that a wheel spider made of magnesium corrodes to a relatively large degree, particularly during a winter operation, when the wheel spider is subjected to the combined influences of salt and water. The pairing of a rim made of magnesium and a wheel spider made of an aluminum alloy is therefore advantageous to reduce the weight of the wheel and to prevent the corrosion of the wheel spider, which is exposed to the elements.

In the case of wheel elements made of a titanium alloy, stability advantages are also achieved, in addition to advantages with respect to weight. A good castability of a rim and a wheel spider made of titanium is ensured, in which case the machinability of titanium wheel elements is also simple.

In certain preferred embodiments, the rim is formed by casting, followed by a rolling or pressing process in order to assure a precise final form without permeations. In other preferred embodiments, the rim is formed by forging, followed by a rolling or pressing process in order to assure a precise final form.

These and other objects, features and advantages of the present invention will become more readily apparent from the following detailed description when taken in conjunction with the accompanying drawings.

BRIEF DESCRIPTION OF THE DRAWING

The single drawing FIGURE is a partial sectional view of a wheel according to the present invention.

DETAILED DESCRIPTION OF THE DRAWING

The wheel 1 comprises essentially a wheel spider 2 which has hollow spokes and which is connected with a ring-shaped rim 3 by way of a friction weld R. The wheel spider 2 is in each case constructed as a cast part, in which case the rim 3 may be produced by a pressing method or by a casting process.

The rim 3 preferably consists of a light metal, such as magnesium or a magnesium alloy, titanium or a titanium alloy and, in a further embodiment, may consist of an aluminum alloy or of aluminum. In the case of cast one-piece magnesium wheels, air permeations will occur in the rim well due to the good heat conductibility of magnesium. Therefore, it is advantageous to cast both wheel elements separately.

Due to the connection of the two wheel elements 2 and by way of the friction weld R, various pairings of the materials of the wheel spider 2 and the rim 3 may be selected according to preferred embodiments of the invention. The following pairings of the materials of the two wheel elements 2 and 3 are some of the combinations contemplated:

a) cast wheel spider made of magnesium, pressed rim made of magnesium;

b) cast wheel spider made of an aluminum alloy, pressed rim made of magnesium;

c) cast wheel spider made of an aluminum alloy, pressed rim made of an aluminum alloy;

d) cast wheel spider made of an aluminum alloy, cast rim made of a titanium alloy;

e) cast wheel spider made of a magnesium alloy, cast rim made of a titanium alloy;

f) cast wheel spider made of a titanium alloy, cast rim made of a titanium alloy;

g) cast wheel spider made of magnesium, cast rim made of magnesium.

These pairings of the wheel spider 2 and the rim 3 being formed of different materials are advantageously made possible by the friction welding because the material-locking connection between these light-metal materials results in an intimate metallic and secure connection.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A vehicle wheel comprising:

a wheel spider having plurality of hollow spokes and a first pair of axially facing welding surfaces;

a rim having a second pair of axially facing welding surfaces which matingly correspond with said first pair of axially facing welding surfaces;

said wheel spider being connected with said rim by friction welding said first pair of axially facing welding surfaces with said second pair of axially facing welding surfaces, wherein the wheel spider is formed from a first material and the rim is formed from a second material, said second material being different from said first material.

2. A vehicle wheel according to claim 1, wherein said first material is a magnesium alloy and said second material is a magnesium alloy.

3. A vehicle wheel according to claim 1, wherein said first material is an aluminum alloy and said second material is an aluminum alloy.

4. A vehicle wheel according to claim 1, wherein said first material is an aluminum alloy and said second material is a magnesium alloy.

5. A vehicle wheel according to claim 1, wherein said first material is an aluminum alloy and said second material is a titanium alloy.

6. A vehicle wheel according to claim 1, wherein said first material is a magnesium alloy and said second material is a titanium alloy.

7. A vehicle wheel according to claim 1, wherein said first material is a titanium alloy and said second material is a titanium alloy.

8. A vehicle wheel according to claim 1, wherein the wheel spider is formed by casting.

9. A vehicle wheel according to claim 1, wherein the rim is formed by casting.

10. A vehicle wheel according to claim 1, wherein the rim is further formed by rolling.

11. A vehicle wheel according to claim 1, wherein the rim is formed by forging.

12. A vehicle wheel according to claim 11, wherein the rim is further formed by rolling.

* * * * *